United States Patent [19]

Tauchenitz et al.

[11] Patent Number: 4,859,922
[45] Date of Patent: Aug. 22, 1989

[54] SYSTEM FOR CONTROLLING THE OPERATING MODE OF A CONTROLLED APPARATUS

[75] Inventors: Harald Tauchenitz, Mainz-Kostheim; Horst Schupp, Griesheim, both of Fed. Rep. of Germany

[73] Assignee: Robert Bosch GmbH, Stuttgart, Fed. Rep. of Germany

[21] Appl. No.: 15,290

[22] Filed: Feb. 17, 1987

[30] Foreign Application Priority Data

Feb. 18, 1986 [DE] Fed. Rep. of Germany ....... 3605088

[51] Int. Cl.$^4$ ............................................. G05B 11/01
[52] U.S. Cl. ...................................... 318/628; 364/190; 360/10.3; 310/93
[58] Field of Search ............... 340/315, 347 P, 347 M; 307/139, 143; 377/2, 45, 2, 45; 364/190; 310/92, 93, 77, 93; 318/628; 360/10.3

[56] References Cited

U.S. PATENT DOCUMENTS

| | | | |
|---|---|---|---|
| 2,911,548 | 11/1959 | Joy et al. ............................. | 310/77 |
| 4,139,872 | 2/1979 | Tachi ............................. | 360/10.3 X |
| 4,161,001 | 7/1979 | Sakamoto ........................... | 360/10.3 |
| 4,428,005 | 0/1984 | Kubo ................................. | 360/10.3 |
| 4,580,210 | 4/1986 | Nordstrom ..................... | 318/628 X |
| 4,684,838 | 8/1987 | Casanova ............................. | 310/93 |

Primary Examiner—William M. Shoop, Jr
Assistant Examiner—Helen Kim
Attorney, Agent, or Firm—Frishauf, Holtz, Goodman & Woodward

[57] ABSTRACT

A control system having a rotatable knob for selecting various operating modes is described. The control system includes a stationary toroidal coil and a braking washer operatively connected with it. The rotary direction, the angular deflection and the function of the braking washer are scanned and supplied to an electronic processing system, whereupon the processing system furnishes the actual control commands to the equipment to be controlled. Among the uses for the control system are to enable remote control of various kinds of equipment in at least two modes of operation, one of them being speed control as a function of the rotational speed of the control system.

20 Claims, 11 Drawing Sheets

FIG. 1b    SECTION A-B (FIG. 1c)

SECTION III-III (FIG. I)

SECTION VI-VI (FIG. 4)

SYSTEM FOR CONTROLLING THE OPERATING MODE OF A CONTROLLED APPARATUS

The present invention relates to an apparatus operating control system and more particularly to a system to control professional tape recorder equipment.

Background: It has been previously been proposed to select the operating mode of reproduction of information signals from an information signal carrier, for example magnetic tape spooled on magnetic tape spools, see German Patent Disclosure Document No. DE OS 31 39 557 to which U.S. Pat. No. 4,428,005 issued Jan. 24, 1984, Kubo, corresponds.

The selector apparatus for the operating mode there disclosed controls a video tape recorder reproduction apparatus, so that it can, for example, operate in a jog mode, or in a continuous mode. In accordance with the disclosure, a control shaft is provided which can be rotated by a control knob and, additionally, can be moved axially between two axial positions. Detectors are provided to determine the angular position, the rotary speed, and direction of rotation of the control shaft. A locking mechanism locks the control shaft in a specific axial position. Upon depression of the control shaft, change over into another axial position occurs.

The operating mode corresponds to the axial position of the control shaft and the tape speed is controlled in accordance with the angular position of the control knob. In another axial position of the control knob, the tape speed is controlled in accordance with the moving speed of the control knob.

The structure permits free rotation of the control shaft about more than 360° in one axial position, but, in another axial position, limits the rotation of the axial knob to less than 360°, symmetrically from a zero or null or center position.

The video tape reproducing apparatus is controlled by a plurality of pulse control apparatus units, in dependence on the axial position and the angular speed or, respectively, the angular deflection of the control shaft.

In a first operating mode, for example in a touch mode also referred to as a "jog" mode, television scenes recorded on magnetic tape can be reproduced in single frame reproduction, corresponding to the angular speed and direction of rotation of the control shaft, either by forward or backward play. In a second operating mode, namely in the general or continuous mode, the speed and direction of operation of the magnetic tape depends on the speed and direction of the angular deflection of the control knob. Consequently, television scenes recorded on magnetic tape can be reproduced, in both forward and reverse direction with variable speed.

The apparatus to select the operating mode of the video magnetic reproducing apparatus is satisfactory, but complex mechanically, and requires complex structure with positioning and braking apparatus, axial positioning mechanisms similar, for example, to a depressed and retracted positioning of a ballpoint pen, and a plurality of pulse source and pulse generator apparatus. They all require substantial space and, consequently, the apparatus is bulky, heavy and expensive.

The Invention: It is an object of the invention to provide an apparatus control system, which is small, lightweight, and can be readily incorporated in portable tape reproducing/recording apparatus, and which is simple and does not require extensive mechanical precision components.

Briefly, a coil, typically a toroidal coil, is positioned concentrically with respect to the axis of rotation coupled to an operating knob. A brake is magnetically coupled to the coil and mechanically coupled to the knob, effective at least up to a predetermined rotary or angular deflection from a zero or a null, or reference position of the knob.

Direction of rotation, rotary or angular deflection from a zero or null position, and axial deflection or shift of the shaft, coupled to the knob, is sensed or scanned, and knob movement signals are derived which are coupled to an electronic processing system. The electronic processing system then provides the control signals or control command to the controlled apparatus, typically the video tape recording apparatus. Simultaneously, a feedback signal is derived from the processing electronic system which energize the coil, so that the operator will receive a humanly perceptible "feel" signal indicating the condition of the controlled apparatus. The electronic processing system, thus, provides a feedback to the operator, for example, that the operator is moving the knob faster than the capability of the magnetic tape recording apparatus to follow—due to inertia of the reels, movement of the tape, and the like. Under those conditions, the control system will provide the signals to control the tape in accordance with the capabilities of the tape handling apparatus and, at the same time, provide a feedback signal which brakes the rotation of the control knob—making it, for example, difficult for the operator to turn the control knob, so that the operator will know that his speed of operation has exceeded the capability of the apparatus to follow.

The apparatus in accordance with the present invention has the advantage that all main units and components necessary for the function can be located within the operating knob itself, so that the outer dimensions thereof can be of minimum size. The knob, and the control system thus can be constructed with low weight of small size and requiring little axial length. Additionally, by electrically simulating the mechanical functions of the controlled apparatus, the mechanical structure of the control knob or operating unit itself can be substantially simplified.

In accordance with the preferred feature of the invention, change in the resulting operating effect to be obtained can be readily accomplished by changing characteristics of the processing electronic system, by processing in a different mode; further, remote control is readily possible by connecting the electrical outputs from the control knob to a remote installation, while receiving feedback signals, likewise, for example, by cable or by another signalling link.

DRAWINGS

FIGS. 1a, 1b and 1c are fragmentary views of details of the structure of FIG. 1;

DETAILED DESCRIPTION

Figure 1:
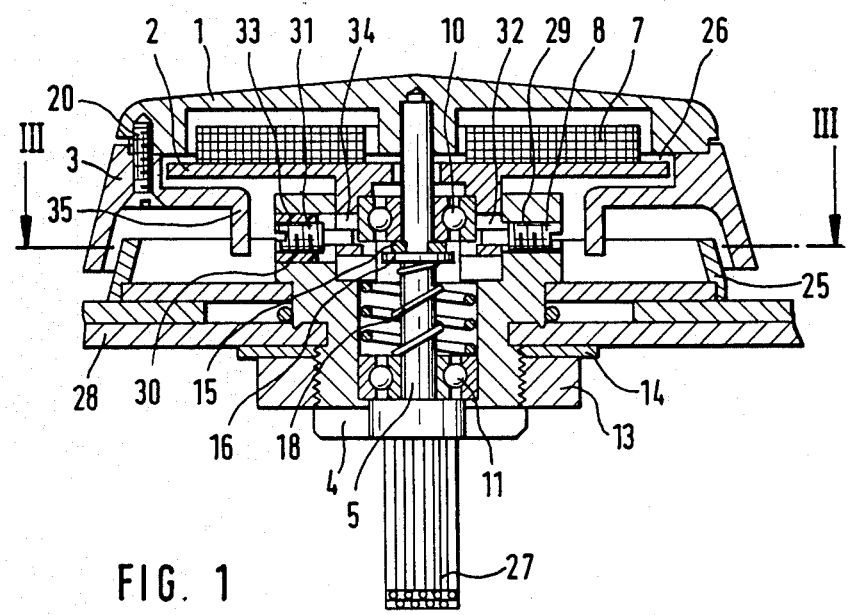
FIG. 1 is a longitudinal section taken through a first embodiment of the control system along the line I—I in FIG. 3.
Figure 2:
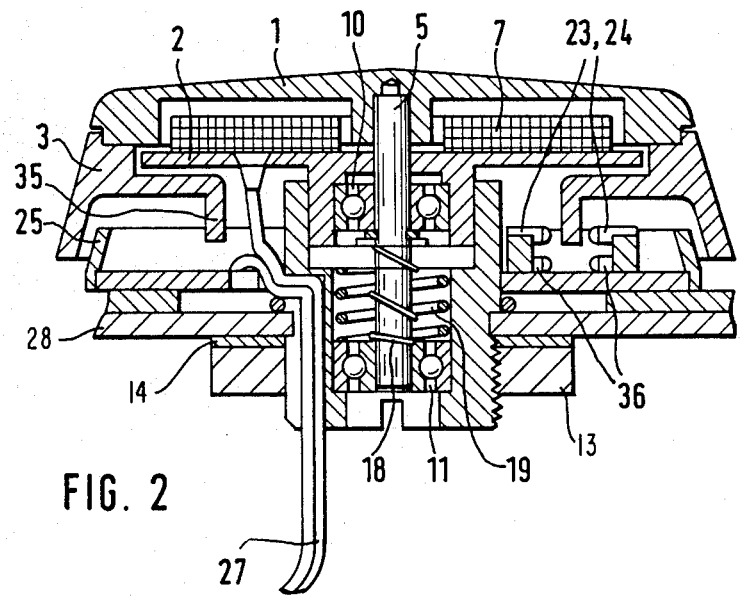
FIG. 2 is a longitudinal section taken through the same control system along the line II—II in FIG. 3.
Figure 3:
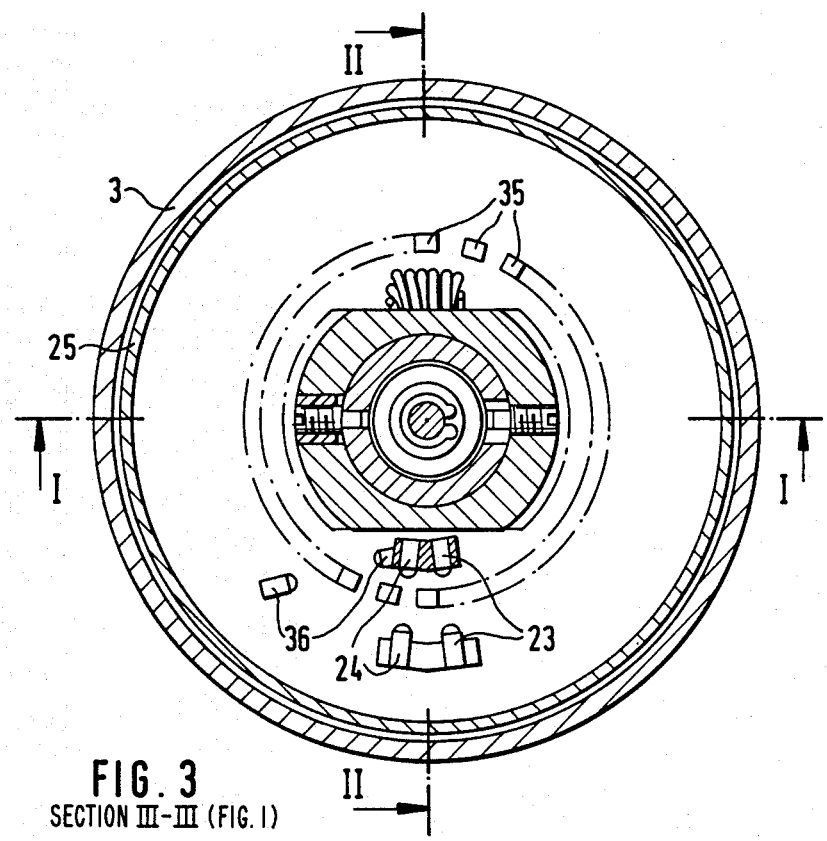
FIG. 3 is a sectional plan view taken along the line III—III of FIG. 1.

FIGS. 1-3 show the hub 1 of the control system, which includes a control knob as shown. The hub 1 is attached to the free end of a shaft 5 and is separated from an armature plate 2 by an air gap 26, in the unactuated state. A toroidal coil 7 is attached to the armature plate 2, and its connections are extended to the outside with the harness 27. The hub 1 and armature plate 2 are each manufactured from a material having good magnetic conductivity. The shaft 5 is supported in two ball bearings 10, 11 such that it is rotatable and longitudinally displaceable. The outer ring of the ball bearing 11 is pressed into a bore of an attachment sleeve 4, while the outer ring of the ball bearing 10 is pressed into a central bore of the armature plate 2. The outer rings of the two ball bearings 10, 11 are braced against one another by means of a first compression spring 19. A second compression spring 18 is supported with one end on the inner ring of the ball bearing 11 and with its second end on a washer 16, which in turn rests on a clamping washer 15 clamped onto the shaft 5.

Figure 1A:
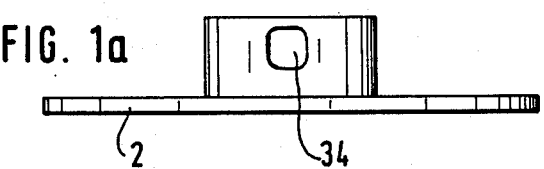
Figure 1C:
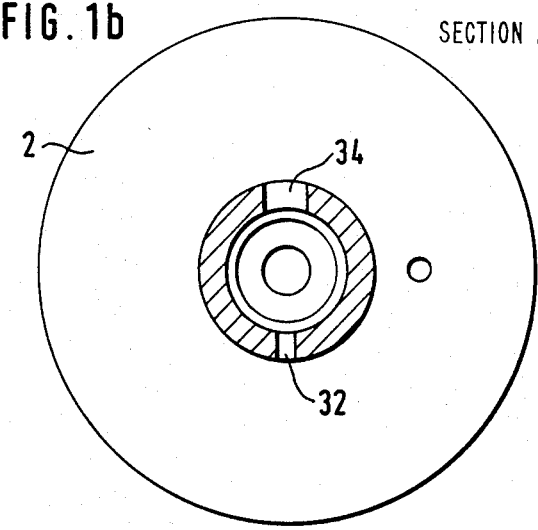
Figure 1C:
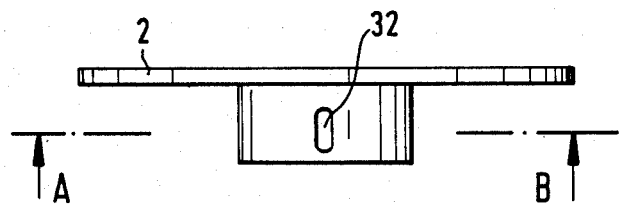

The attachment sleeve 4 is attached by means of an eight-sided nut 13, with an interposed star lock washer 14, to the operating panel 28 of a video magnetic tape recorder unit, a remote control apparatus, a mixing panel or the like. The attachment sleeve 4 has a threaded bore 29, diametrically opposed to the axis of symmetry, and a bore 30. A threaded pin 8 having a prong is screwed into the threaded bore 29, its prong protruding into an oblong slot 32 of the armature plate 2, the longitudinal extension of which extends parallel to the axis of rotation (see FIG. 1c). A further threaded pin 31 having a prong is secured in the through bore 30, with a resilient plastic sleeve 33 disposed between them. The prong of the threaded pin 31 protrudes into an oblong slot 34 of the armature plate 2 (see FIG. 1a), the longitudinal orientation of which extends parallel to the orientation of the shaft 5 and thus to the axis of rotation of the control system.

Secured to the outer circumference of the hub 1, by means of a plurality of screws 20, is a knob sleeve 3, of which the outer circumference, for the sake of easier handling, is extended downward as far as the operating panel 28, except for a slight space in between, and extends engagingly over a dust protector ring 25. The hub 1 continues on the inside, terminating in teeth 35 indentations of a pulse transducer. The pulse transducer has two first forked, or two element light gates 23, 24 (FIGS. 2 and 3), which are arranged spaced apart by a distance of n+½ spacings on a circuit board 6, centrally with respect to the shaft 5, and are penetrated by the teeth 35 of the of the knob sleeve. A further light gate device 36 is provided on the circuit board, axially offset with respect to the light gate devices 23, 24, and its optical axis is rotated with respect to the radial in such a way that when the tooth 35 enters the beam of light, this beam is always interrupted, regardless of the particular rotational status of the tooth 35.

Operation: The mode of operation of the control system will be explained in detail further below. At the outset it should be noted merely that the described construction is capable of assuming three axial states.

(1) In the first axial position, which corresponds to what is shown in FIGS. 1 and 2, the hub 1 with the knob sleeve 3 is freely rotatable. The teeth 35 of the tooth indentation arrangement of the hub intersect the course of the beam of the forked or two element light gates 23 and 24.

(2) When the hub 1 is depressed, in a first stage, the compression spring 18 is compressed until the air gap 26 between the hub 1 and the armature plate 2 tends to become zero. By friction of the hub 1 on the armature plate 2, the rotation of the hub 1 meets with increased resistance. The elimination of the air gap 26 can also be considered a consequence of an electrical effect on the control system. By the application of a voltage via the connections 27 to the coil 7, a magnetic field is generated in the armature plate 2, which closes via the air gap 26 and hub 1 and thus causes the elimination of the air gap 26.

(3) Upon further depression of the hub 1, with the knob sleeve 3 secured to it, the armature plate 2 is moved counter to the force of the compression spring 19, until the prongs of the two threaded pins 8, 31 serve as a stop to the tops of the recesses 32, 34 in the armature plate. The tooth indentation arrangement of the knob sleeve 3, having the teeth 35, is lowered in this process to such an extent that the teeth interrupt the beam of light of the forked light gate 36.

Figure 4:
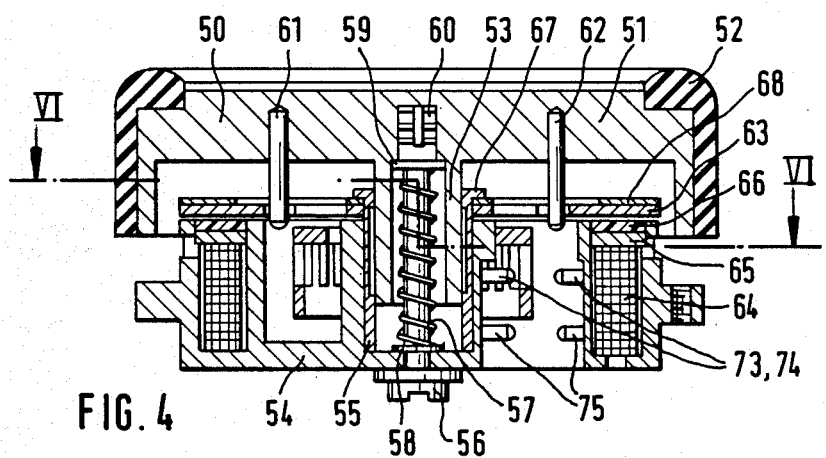
FIG. 4 is a longitudinal section taken through a second embodiment of the control system.
Figure 5:
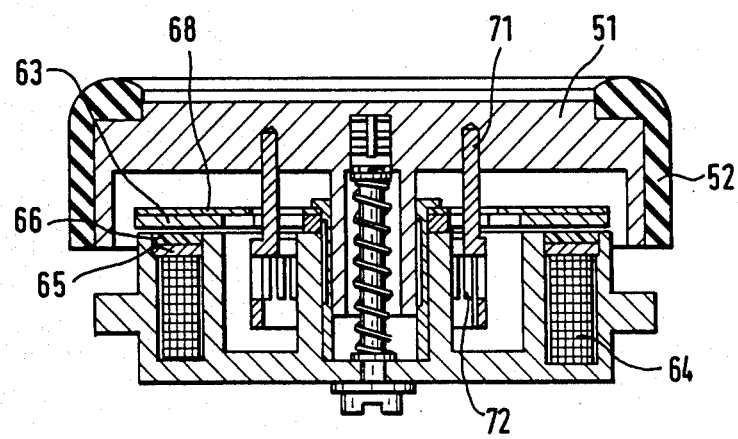
FIG. 5 is a longitudinal section taken through the same control system in a different view.
Figure 6:
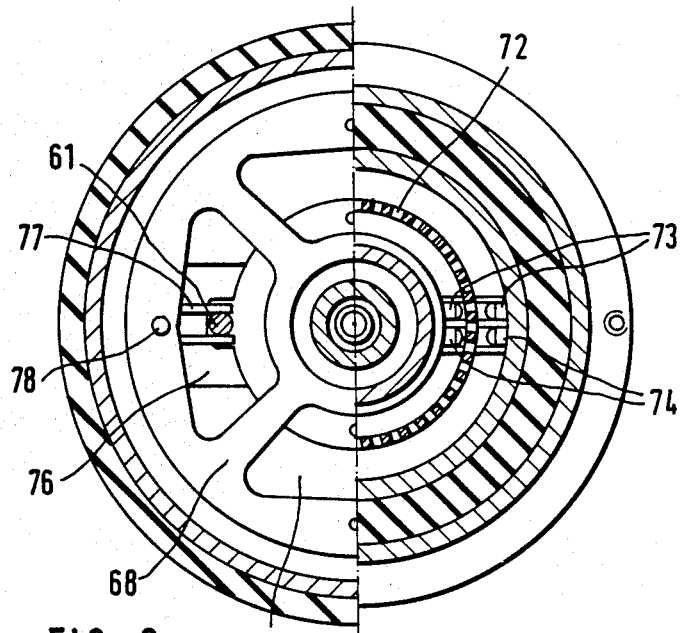
FIG. 6 is a plan view, partly in section along the line VI—VI in FIG. 4.

For the sake of simpler structure, the second exemplary embodiment of the control system shown in FIGS. 4-6 has a hub sleeve 53, for supporting the operating or control knob 50, comprising the hub 51 and the knob sleeve 52. The hub sleeve 53 is arranged such that it is slidable and rotatable in a bearing sleeve 55 secured in the magnet 54, which is cup-shaped. The location of the operating knob 50 relative to the cup-shaped magnet 54 is determined by a headless screw 56 in cooperation with a compression spring 57. On the side of the magnet 54, the compression spring 57 is supported against a washer 58, and toward the hub side it is supported against a washer 59. The headless screw 56 is secured in the hub 51, which is made of a soft nonmagnetic material, by means of a pressed-in nut 60. The knob sleeve 52, for the sake of better handling of the control system, may for example comprise a rubber compound.

Two cylindrical pins 61, 62 are let into the hub 51, with their free ends connecting the armature plate 63 to the hub 51 such that the armature plate is fixed against relative rotation but longitudinally displaceable. The magnet 54 contains a toroidal coil 64, which is covered with an aluminum washer 65 toward the armature plate, and a brake lining 66 is glued to the aluminum washer 65. The bearing sleeve 55 has a collar 67 on its upper end, which fixes a cup spring 68 arranged above the armature plate 63.

A sleeve 71 is also connected to the hub 51, the sleeve having on its circumference a number of slit-like openings 72 for the light from two forked or two-element light gates 73, 74 to pass through. The two forked light gates 73, 74 are arranged spaced apart from one another by a distance that deviates by one-half spacing from an integral multiple of the spacing of the slits 72 in the sleeve 71, for the sake of obtaining forward-backward recognition. Underneath the forked light gates 73, 74, a further forked light gate 75 is provided, which is darkened when the knob is depressed and the sleeve 71 is therefore lowered, so that the light gate emits a signal. A recess 76 is let into the armature plate 63 (see FIG. 6), and a U-bent tweezer-type spring 77 is placed in this recess between the armature plate and a cup spring 78. The armature plate 63 is joined to the cup spring 68 by means of a rivet 78. The cylindrical pin 61 grips between the legs of the tweezer-type spring 77 and is joined to the hub in a manner fixed against relative rotation, to enable turning the control knob 50 by at least one-half the spacing of the slits 72 in the sleeve 71 when the armature plate 68 is blocked by the coil 64.

Figure 7:
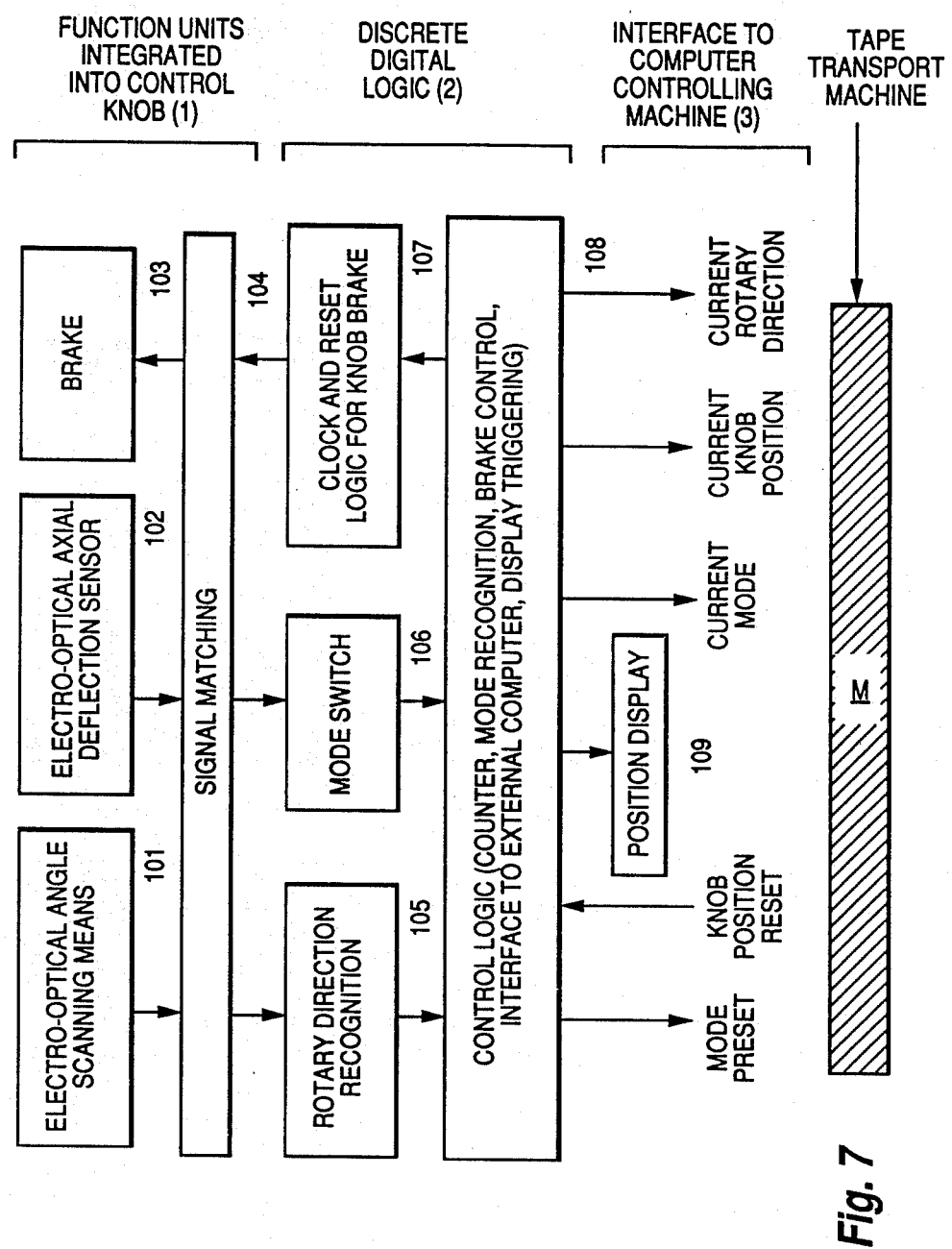
FIG. 7 is a block circuit diagram showing the control logic circuit for the control system.

The control logic shown in the block circuit diagram of FIG. 7 is divided into three function groups:

(1) The first function group includes the function units that are physically incorporated into the control system. These are substantially the electrooptical angle scanning means 101, the electrooptical axial deflection sensor 102 and the electromechanical brake 103, as well as the devices for signal matching 104.

(2) The components of the digital logic are combined into a second function group. This group includes the rotary direction recognition means 105, the mode switch 106, the clock and reset logic for the brake 107 and the actual control logic, comprising the counter operating mode recognition means, brake control means, interface to the external computer, and display control means 108.

(3) The third function group substantially contains a position display means 109 as well as the input interfaces for the operating mode and knob position preset means, and the output interfaces for the current data relating to the operating mode, knob position and rotary direction.

Figure 8:
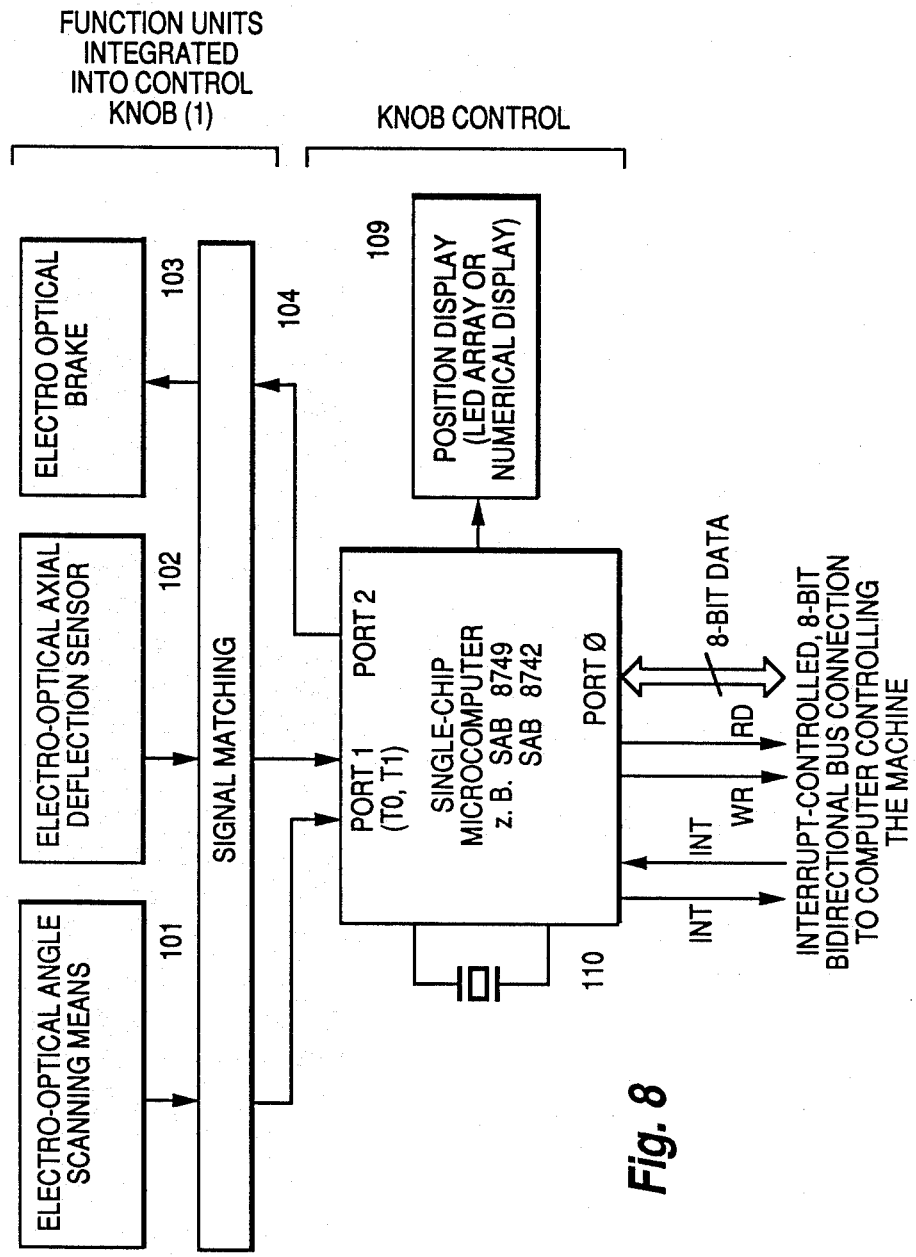
FIG. 8 is also a block circuit diagram, showing the single-chip microcomputer control of the control system.

FIG. 8 shows a detail of the diagram of FIG. 7, in a different manner. In FIG. 8, in the form of a block circuit diagram, the function units integrated into the control knob are shown, that is, the electrooptical angle scanning means 101, the electrooptical axial deflection sensor 102, the electromechanical brake 103 and the signal matching means 104, as well as the control means located outside the control knob, in the present case comprising a single-chip microcomputer 110, for example, SAB 8749 or SAB 8742, along with the position display 109, which may be in the form of a numeric display or an array of light-emitting diodes (LEDs). The connections to the control computer of the equipment are also shown.

Figure 9:
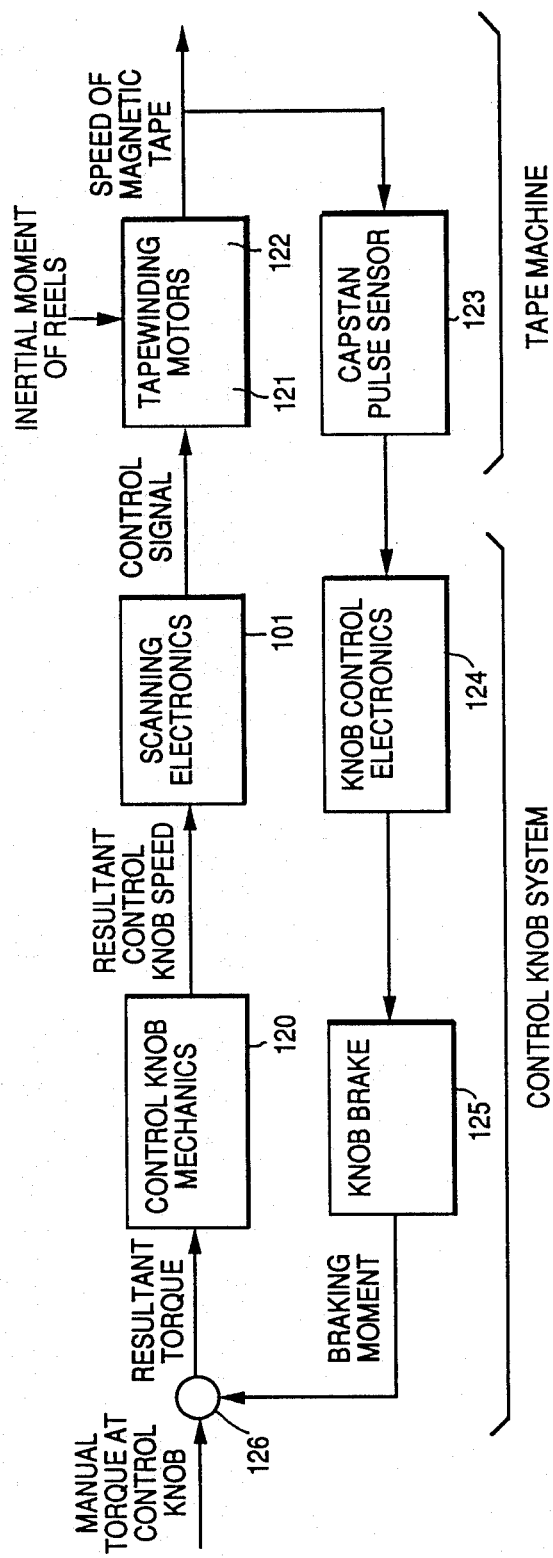
FIG. 9 is a block circuit diagram showing the functional course in a first of two possible operating modes of the control system.

In the block circuit diagram of FIG. 9, the circuit layout for fixed coupling of the rotational speed of the control knob to the magnetic tape speed is shown. Especially when there are rapid changes in the rotary speed of the control knob, the tape winding motors of the magnetic tape unit, for instance, cannot follow along with these speed changes, because of the inertia of the reels of tape secured to it. The circuitry concept shown counteracts the torque exerted upon the control knob by the user of the equipment with a braking moment which exhibits proportional behavior with respect to the difference in speed between the control knob and the magnetic tape. Operation of the control knob that is in accordance with the realistic acceleration of the magnetic tape is not counteracted by any braking torque. The regulation of the control knob braking torque described in principle can be realized in a simple manner by using the single-chip microcomputer. The microcomputer must merely be supplied with data relating to the tape speed.

The torque on the control knob mechanics 120, exerted upon the control knob by the person using the equipment, generates a control knob speed. The positional signal resulting from the electrooptical angle scanning means 101 in combination with the signal matching means 104 affects the torque of the tape winding motors 121, 122, resulting in a magnetic tape speed. This speed is converted, via the pulse detection of the tape drive capstan 123, into a speed-dependent signal, which the control electronics 124 set in proportion to the position signal of the electronic scanning means 101, and in accordance therewith, the knob brake 125 is actuated with alternating braking torque. The difference between the torque exerted manually upon the control knob and the contrary braking moment of the knob brake 125 produces the resultant torque that acts upon the control knob mechanics.

Figure 10:
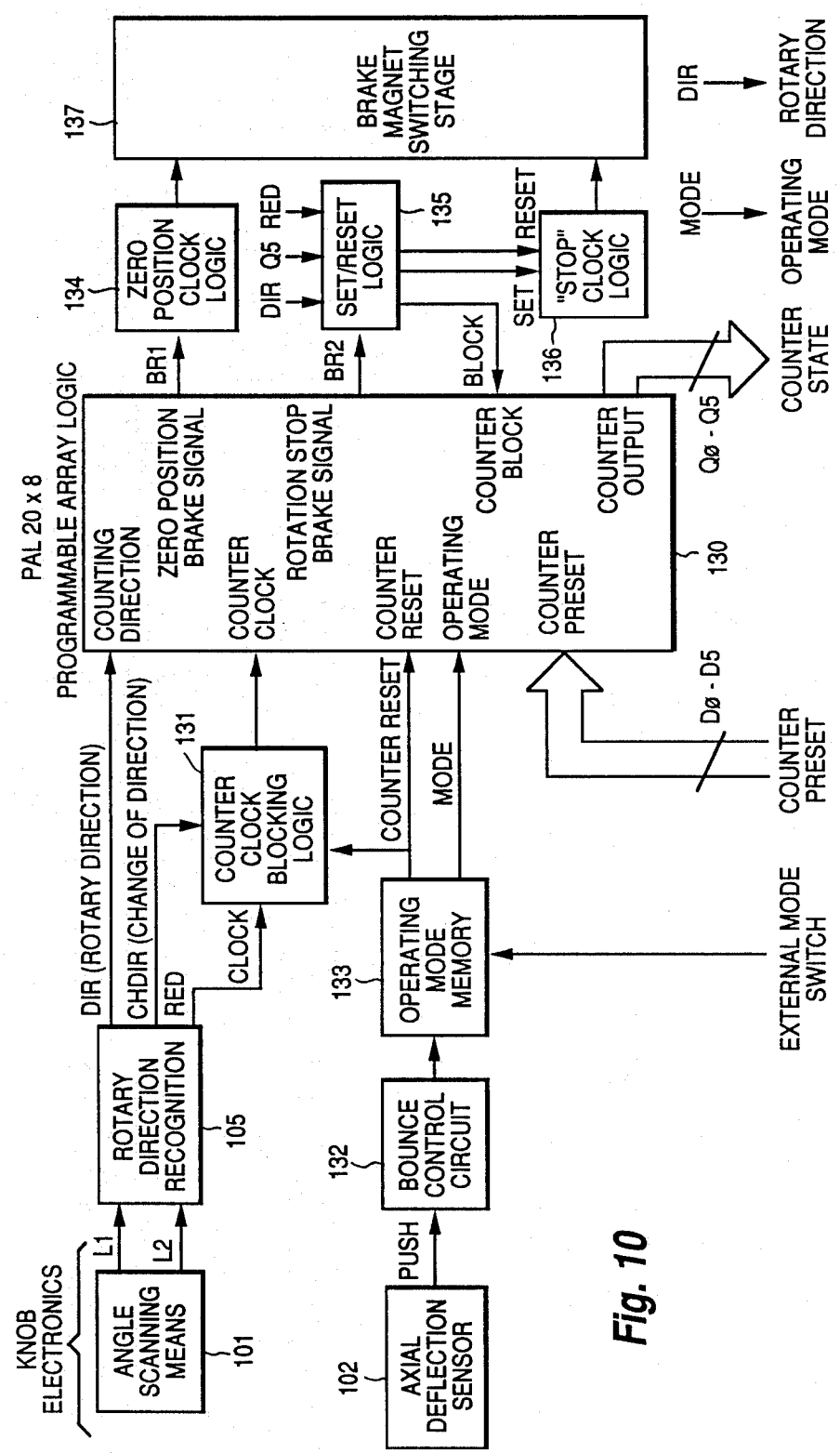
FIG. 10 is an expanded block circuit diagram showing the structure of the control logic circuits.

The structure of the control knob logic is shown in FIG. 10, again in a block diagram. The meandering signal trains generated by the electrooptical angle scanning means 101, which are offset from one another by 90°, are supplied to the rotary direction recognition means 105, which from them supplies counting pulses to an input of a circuit 130 operating as a forward-backward counter. A recognition signal for the change in rotary direction is also obtained from the train of the two signals L1/L2 and supplied together with the clock signal obtained from it to the counter clock blocking logic 131.

Adjoining the axial deflection sensor 102 is a swipe, chatter, or bounce control circuit 132, which is followed by an operating mode memory which is also influenced by an external operating mode switch. The two outputs of the operating mode memory 133, in the form of RESET pulses, affect the counter blocking logic 131 and the RESET input of the forward-backward counter 130 as well as the operating mode input of this forward-backward counter. A presetting of the counter can be performed via a preset input of the forward-backward counter 130.

Connected to this forward-backward counter 130 are a "zero position" clock logic 134 and a SET/RESET logic 135. A "stop" clock logic 136 connected to the SET/RESET logic 135, together with the zero position logic 134, acts upon a switching stage 137 for the brake magnet.

Figure 11A:
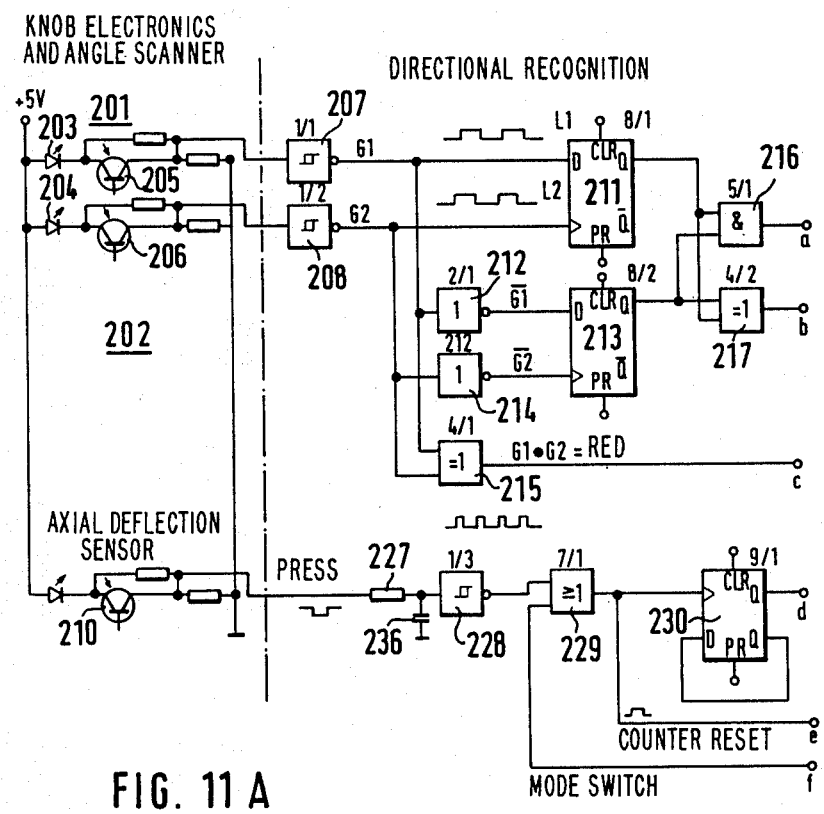
FIG. 11 shows the control logic as a discrete circuit.
Figure 11:
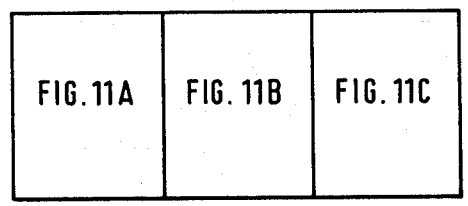

FIG. 11 shows the control knob logic in detail. The two forked or two-element light gates 201 and 202 cooperate with the pulse transducer device that is connected to the rotatable portion of the control system. Each light gate, in the operative electrical portion, comprises one light-emitting diode 203, 204 and one photoelectric transistor 205, 206. The output of the photoelectric transistor 205 is connected to the input of a Schmitt trigger 207, while the output of the photoelectric transistor 206 is connected to the input of the Schmitt trigger 208. The two Schmitt triggers make the pulse flanks of the output signals from the light gates steeper. The light gates 201, 202 are arranged with respect to the pulse transducer washer or pulse transducer toothed sleeve (not shown in FIG. 8) in such a way that the two meandering signal trains from the outputs of the Schmitt triggers 207, 208 are phase-offset from one another by 90°. From the phase displacement between the signal L1 and the signal train L2, the direction recognition is derived. Inside the control system, a further forked or two-element light gate 210 is provided, the passage of its light being interrupted when the control system is actuated axially. This axial displacement serves to switch over the operating mode of the equipment connected to it, for example a magnetic tape unit.

The signal train L1 from the output of the Schmitt trigger 207 is supplied first to the D input of a first flip-flop 211, and parallel to it, via an inverting stage 212, to the D input of a second flip-flop 213. The signal train L2 passes from the output of the Schmitt trigger 208 to the clock input of the D flip-flop 211 and parallel, via a second inverting stage 214, to the clock input of the D flip-flop 213. The outputs of the Schmitt triggers 207, 208 are furthermore connected to the two inputs of an OR gate 215, so that a clock signal can be obtained at its output.

Figure 11B:
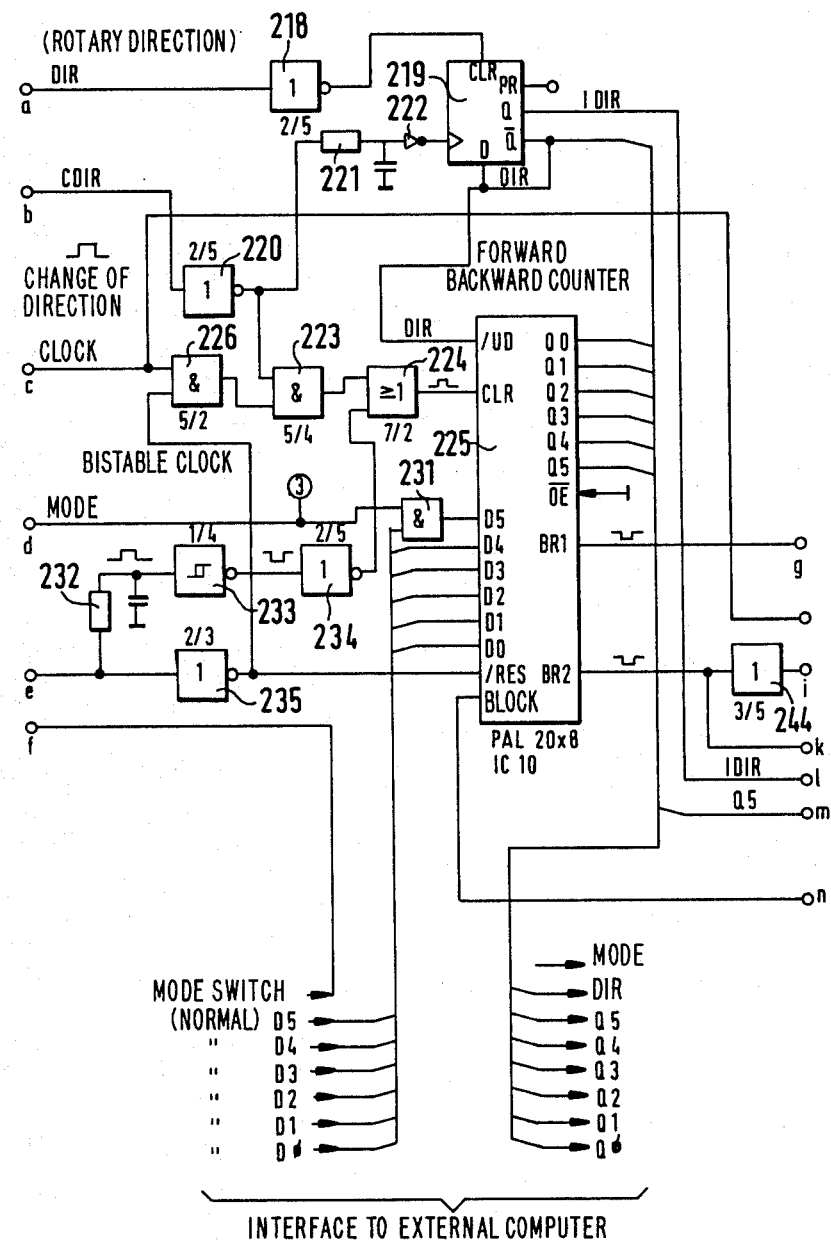

The Q output of the D flip-flop 211 is connected in parallel to one input of an AND gate 216 and an OR gate 217, while the Q output of the D flip-flop 213 is connected to the second input of the AND gate 216 and the second input of the OR gate 217. The output of the AND gate 216 is connected via an inverter stage 218 (see FIG. 11B) to the RESET input of a D flip-flop 219, while the output of the EXCLUSIVE-OR gate 217, via a further inverter stage 220, a resistor 221 and the inverting amplifier 222, to the clock input of the D flip-flop 219. The output of the inverter stage 220 is also connected to one input of the AND gate 223, the output of which is connected to one input of the OR stage 224. From the output of the OR stage 224, a line leads to the clock input of a programmable counter 225. The output of the EXCLUSIVE-OR gate 215 is connected to one input of the AND gate 226, the output of which is connected to the second input of the AND gate 223. From the output $\overline{Q}$ a line leads to the directional input of the programmable counter 225, as well as to the D input of the D flip-flop 219. From the output of the forked or two-element light gate 210, a line leads via the resistor 227 to the Schmitt trigger 228 with the inverter stage connected to it. The Schmitt trigger 228, like the two Schmitt triggers 207 and 208, may be omitted if the signal form from the output of the corresponding light gate allows this. The output of the Schmitt trigger 228 is carried to one input of the OR gate 229 and a line from an external operating mode switch, in the equipment connected to it, leads to the second input of this OR gate 229. The clock input of the D flip-flop 230 is connected to the output of the OR gate 229. The output $\overline{Q}$ of this flip-flop 230 is linked to the D input of the same flip-flop, while the output Q leads via an AND gate 231 to the input D5 of the programmable counter 225. From the output of the OR gate 229, one current path also leads via the resistor 232, the Schmitt trigger 233 with the inverter stage connected to it and the inverter stage 234, to the second input of the OR gate 224, the output of which is connected to the clock input CLK of the programmable counter 225. From the output of the OR gate 229, a line also leads to the input of the inverter stage 235. The output of this stage is connected first to the RESET input RES of the programmable counter 225 and second to the second input of the AND stage 226.

Figure 11C:
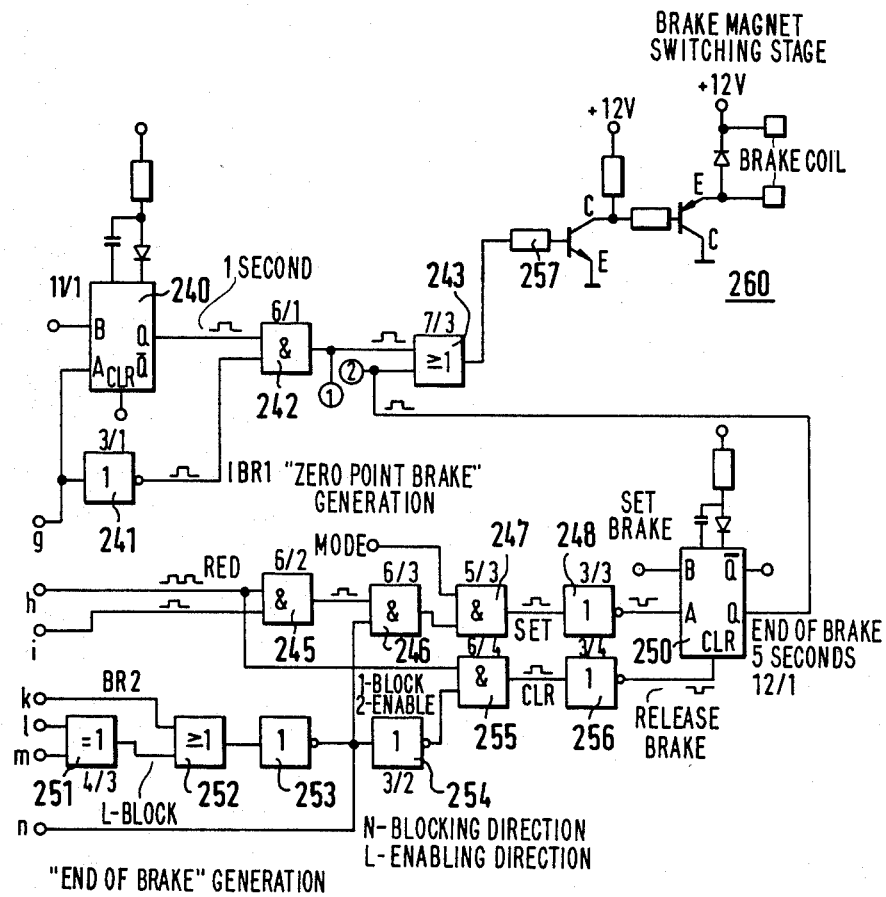
Figure 11C:
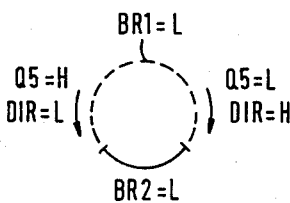

Leading from the output BR1 of the programmable counter 225 (see FIG. 11B) is a line to the input A of the multi-stable flip-flop 240 (see FIG. 11C) and via the inverter stage 241 to an input of the AND gate 242, the second input of which is connected to the output $\overline{Q}$ of the multistable flip-flop 240. The output of the AND gate 242 leads to the input of the OR gate 243.

The output BR2 (see FIG. 11B) of the programmable counter 225 leads via the inverter stage 244 to one input of the AND gate 245 (see FIG. 11C), and via a further AND gate 246 and a third AND gate 247 to an inverter stage 248, and from there to the input A of the multi-stable flip-flop 250. An EXCLUSIVE-OR gate 251 receives at one input signals from the output $\overline{Q}$ of the D flip-flop 219 and at the other input signals from the output Q5 of the programmable counter 225. From the output of the EXCLUSIVE-OR gate 251, a line leads via an OR gate 252, a first inverter stage 253, a second inverter stage 254, an AND gate 255 and a further inverter stage 256 to the RESET input of the multistable flip-flop 250. The output of the inverter stage 253 is also linked to the BLOCK input of the programmable counter 225 and to the second input of the AND gate 246; the second input of the AND gate 245 is linked to the output of the EXCLUSIVE-OR gate 215, and with the second input of the AND gate 255. From the output $\overline{Q}$ of the multistable flip-flop 250 a line leads to the second input of the OR gate 243. The output of the OR gate 243, via a resistor 257, is applied to the switching stage 260 for actuating the brake coil 7 (FIG. 1) of the control system.

The pulse trains L1, L2 furnished by the two light gates 201, 202 are derived from the circumferential encoding of the control system, and are offset from one another by 90°. As already noted, the Schmitt triggers 207, 208 can be omitted if the signals from the light gates are sufficiently steep-sloped and interference-free. The two pulse trains L1, L2 are supplied inverted to the D flip-flop 213 and noninverted to the D flip-flop 211. In both flip-flops a check is made as to which state the signal L1 has when a positive flank of the signal L2 is present, and the output $\overline{Q}$ is set accordingly. By the inversion in the inverter stages 212, 214, the negative flank of the original signal is in fact examined in the D flip-flop 213. The logical AND linkage 216 at the output of the two flip-flops 211, 213 produces a signal at the output which is representative of the rotational direction of the control system at that instant. For example, the output of the AND gate 216 is HIGH if the rotation is clockwise and LOW when rotation is counterclockwise. The EXCLUSIVE-OR gate 217 connected parallel to the AND gate 216 to the outputs of the D flip-flops 211, 213 emits a HIGH pulse each time a different signal is present at each of the two inputs. This is always the case whenever the rotational direction of the control system is changed.

The forked light gate 210 never emits a signal whenever the axial deflection function of the control system is intended to switch on a different operating mode. This LOW pulse passes through a surge supression circuit, comprising the resistor 227 and the capacitor 236, and after passing through the inverter circuit 228 is delivered to one input of the OR gate 229, the other input of which can have an external operating mode switching pulse applied to it. The particular operating mode selected is stored in memory in the flip-flop 230 and can be switched over, either by actuating the axial deflection function and thus the light gate 210, or externally. With the CLR input this flip-flop 230 is set to a particular operating mode, by switching on the equipment. The programmable counter 225 in the exemplary embodiment is realized by means of a PAL component of the PAL 20X8 type and is a six-bit forward-backward counter with various additional functions. The counter component furnishes a binary encoded output signal Q0-Q5 to the corresponding outputs, in accordance with the input conditions at the inputs D0-D5. This output signal is incremented upward or downward upon each counter pulse at the clock input CLK in accordance with the upward-backward input signal UD. Table 1 shows the output conditions as a function of input conditions for the outputs Q0-Q5 and BR1 as well as BR2. Table 2 is the function table of the component 225.

The counter 225 can be preset to a particular value. Upon activation of the input RES, the preset value D0-D5 present at the counter is fed into the output register Q0-Q5. In any operating mode, the counter can also be prevented from further counting by the application of a BLOCK signal. The counter state then is maintained without change. In one operating mode of the control system it is desirable to define the zero or null position by means of a specific counter state. In the present exemplary embodiment the zero position of the control knob is defined by the counter state HHHLLL. In this one of two operating modes, each time this predetermined counter state appears the braking signal BR1 is activated, in order to simulate a zero point basic grid. Beginning at the above-defined zero position, the counter can count upward or downward, i.e., forward or backward, by means of turning the control knob to the right or to the left. In order to simulate a stop for the control knob, the counting range is limited by switching on the brake magnet at the output of the switching stage 260.

The counting range is limited at the bottom by the value LLLHHH and at the top by the value HHHLLL. Upon reaching these counting range thresholds, the braking signal BR2 is activated. The component 225 furthermore makes it possible to connect the output signals Q0-Q5 directly to a microprocessor data bus. To this end, the output connections Q0-Q5 can be made to have high resistance via the connection OE, so that they can be called up directly by the microprocessor data bus.

The programmable counter 225 also triggers a signal at the output BR1 for actuating the brake magnet whenever the control knob is being operated in the "fast rewind" mode and the counter state is HHHLLL. This counter state is the middle position, so that as a result a signal is simulated at the output BA1 as well for simulating the detent position in the middle position of the control knob.

The component 225 also furnishes the signal BF2 for representing the stops in the fast "search" run mode. It is triggered at the counter state HHHLLL, or LLLHHH in the opposite direction of movement. Via the BLOCK input, the counter is stopped when a brake signal appears at the output BR2, so that the counter counts no further. As a result, the clock signal is taken away, the further counting in the applicable direction is suppressed.

With the activation of the /RES input of the component 225, the input information at the inputs D0-D5 is taken over into the outputs Q0-Q5, and the counter begins to count from there on. As a result, the forward-backward counter 225 can be prepositioned to specific values under the direction of an external circuit.

The monostable flip-flop 240 is set by the external circuitry to a time of approximately 1 second. That is, if a pulse flank appears at the output A, the monostable flip-flop 240 becomes active for approximately 1 second. The inverter 241 shortens the prior from 1 second to a brief instant, so that upon passage through zero the brake attracts only quite briefly, thereby simulating a zero grid.

The monostable flip-flop 250 has been assigned a time constant of 5 seconds by the external circuitry. As a result, the end stop when the final counter position is reached is maintained for a maximum of 5 seconds; after that the brake drops away. Upon recognition of a reversal of the rotary direction of the control knob, the monostable flip-flop 250 should be reset immediately, however, so that no resistance is presented to a contrary movement. The logic from the gates 251-256 decides, in accordance with the instantaneous counting direction, whether the brake signal BR2 is maintained or the monostable flip-flop 250 is reset via the CLR input.

The circuit described in FIG. 11, partially made up of discrete elements, can be made to occupy substantially less space, however, if further PAL components are used. (PAL=Programmable Array Logic and is a trademark of the MMI company.)

A second similarly designed circuit in combination with time-multiplex connected resistors can generate a regulated braking action on the control knob, in such a manner that an electrical interconnection or signal between the control knob and the tape speed is compulsorily maintained. This may be provided in particular for the eventuality that the speed of the control knob is changed so abruptly that the relatively sluggish tape reels are incapable of following along with this change in speed. Gentle braking of the control knob can also be attained by a kind of frequency modulation.

TABLE 1

| PAL20X8 6 BIT UP DOWN COUNTER | PAL DESIGN SPECIFICATION |
|---|---|
| CLK /RES D5 D4 D3 D2 D1 D0 9 LOCK /UD GND | |
| /OC BR1 15 16 Q5 Q4 Q3 Q2 Q1 Q0 BR2 VCC | |
| /BR1 = /Q5* Q4* Q3* Q2* Q1* Q0* /RES* D5 | ;SHUTTLE = D5 |
| /BR2 = Q5* Q4* Q3* /RES* D5 | ;−25 > BR2 > 25 |
|     +/Q5* /Q4* /Q3* /RES* D5 | ;SHUTTLE = D5 |
| /Q0 := RES* /D0 | ;RESET |
|     + /RES* /Q0 | ;HOLD |
|     :+: /RES* UD* /LOCK | ;INCREMENT |
|     + /RES* /UD* /LOCK | ;DECREMENT |
| /Q1 := RES* /D1 | ;RESET |
|     + /RES* /Q1 | ;HOLD |
|     :+: /RES* UD* Q0* /LOCK | ;INCREMENT |
|     + /RES* /UD* /Q0* /LOCK | ;DECREMENT |
| Q2 := RES* /D2 | ;RESET |
|     + /RES* /Q2 | ;HOLD |
|     :+: /RES* UD* Q0* Q1* /LOCK | ;INCREMENT |

TABLE 1-continued

| PAL20X8 6 BIT UP DOWN COUNTER | PAL DESIGN SPECIFICATION |
|---|---|
| + /RES* /UD* /Q0* /Q1* /LOCK | ;DECREMENT |
| /Q3 : = RES* /D3 | ;RESET |
| + /RES* /Q3 | ;HOLD |
| : + : /RES* UD* Q0* Q1* Q2* /LOCK | ;INCREMENT |
| + /RES* /UD* /Q0* /Q1* /Q2* /LOCK | ;DECREMENT |
| /Q4 : = RES* /D4 | ;RESET |
| + /RES* /Q4 | ;HOLD |
| : + : /RES* UD* Q0* Q1* Q2* Q3* /LOCK | ;INCREMENT |
| + /RES* /UD* /Q0* /Q1* /Q2 /Q3* /LOCK | ;DECREMENT |
| /Q5 : = RES* /D5 | ;RESET |
| + /RES* /Q5 | ;HOLD |
| : + : /RES* UD* Q0* Q1* Q2* Q3* Q4* /LOCK | ;INCREMENT |
| + /RES* /UD* /Q0* /Q1* /Q2* /Q3* /Q4* /LOCK | ;DECREMENT |

TABLE 2

FUNCTION TABLE

| CLK | /RES | /UD | /OC | LOCK | D5 D4 D3 D2 D1 D0 | Q5 Q4 Q3 Q2 Q1 Q0 | BR1 | BR2 | |
|---|---|---|---|---|---|---|---|---|---|
| ;C ;L ;K | R E S | / / U D | / / O C | S P E R | D D D D D D 5 4 3 2 1 0 | Q Q Q Q Q Q 5 4 3 2 1 0 | B R 1 | B R 2 | |
| C | L | X | L | X | H L L L L L | H L L L L L | H | H | 0 PRESET AT ZEROPOINT |
| C | H | L L | | L | X X X X X X | H L L L L H | H | H | +1 |
| C | H | L L | | L | X X X X X X | H L L L H L | H | H | +2 |
| C | H | L L | | L | X X X X X X | H L L L H H | H | H | +3 |
| C | H | H L | | L | X X X X X X | H L L L H L | H | H | +2 |
| C | H | H L | | L | H X X X X X | H L L L L H | H | H | +1 |
| C | H | H L | | L | H X X X X X | H L L L L L | H | H | 0, BR1 |
| C | H | H L | | L | H X X X X X | L H H H H H | L | H | −1, |
| C | H | H L | | L | H X X X X X | L H H H H L | H | H | −2 |
| C | H | H L | | L | H X X X X X | L H H H L H | H | H | −3 |
| C | H | L L | | L | H X X X X X | L H H H H L | H | H | −2 |
| C | H | L L | | L | H X X X X X | L H H H H H | L | H | −1, |
| C | H | L L | | L | H X X X X X | H L L L L L | H | H | 0,BR1 |
| C | H | L L | | L | H X X X X X | H L L L L H | H | H | +1 |
| C | L | X L | | L | H H L H H H | H H L H H H | H | H | +24 DUMMY PRESET BEFORE R. |
| C | H | L L | | L | H X X X X X | H H H L L L | H | L | +25 BR2 |
| C | H | L L | | H | H X X X X X | H H H L L L | H | L | +25 BR2, COUNTERSTOP |
| C | H | H L | | L | H X X X X X | H H L H H H | H | H | +24 |
| C | L | X L | | L | L L H L L H | L L H L L H | H | H | −23 |
| C | H | H L | | L | H X X X X X | L L H L L L | H | H | −24 DUMMY PRESET BEFORE L. |
| C | H | H L | | L | H X X X X X | L L L H H H | H | L | −25 |
| C | H | H L | | H | H X X X X X | L L L H H H | H | L | −25 BR2, COUNTERSTOP |
| C | H | L L | | L | H X X X X X | L L H L L L | H | H | −24 |

We claim:

1. Control system for controlling the operating mode of an apparatus (M) having
    a movable operator controllable knob (1, 50), said knob being deflectable from a reference position by being rotatable and axially shiftable, for controlling operating modes of the controlled apparatus (M, 28) by rotation and axial shifting of the knob, including
    means (23, 24, 36) for scanning deflection of the knob from the reference position and providing knob movement signals representative of said deflection,
    said knob movement signals including
    a first electrical control signal representative of the angular deflection of the knob and a second electrical control signal representative of the speed of angular deflection, and of the direction from the reference position of the knob,
    said system comprising
    a toroidal coil (7, 64) positioned concentrically with the axis of rotation (5) of the operator controllable knob (1, 50);
    a brake disk (2, 63) magnetically coupled to the toroidal coil and further mechanically coupled to the knob for effecting braking at a predetermined angular deflection of the knob;
    and control means receiving said knob movement signals coupled to and selectively energizing said toroidal coil.

2. The system of claim 1 wherein the scanning means (23, 24, 36) further scans axial shifting of the knob, and the knob movement signals further include
    axial knob shift signals representative of the axial position of the knob,
    and an electronic processing system is provided, to receive the knob movement signals from said scanning means,
    said electronic processing system including said control means,
    said electronic processing system being connected to and providing control signals to the controlled apparatus (M, 28),
    said electronic processing system being further connected to said toroidal coil for providing energizing signals to the coil (7, 64) to furnish humanly perceptible feedback to an operator handling and moving said knob.

3. The system of claim 2 further comprising stop means defining a predetermined angular deflection of the knob from a reference position,
and wherein said stop means are responsive to energization of the coil.

4. The system of claim 3 wherein, upon energization of said coil and locking of said braking means (2, 63) the knob is movable for a limited angular deflection for controlling of said electronic processing system to provide at least one moving pulse.

5. The system of claim 2 wherein the knob shift signals are coupled to said electronic processing system for controlling the operating mode of said apparatus;
and wherein the scanning means (36) scanning the axial position of the operating knob scans said axial position independently of the deflection of the operating knob.

6. The system of claim 2 wherein said electronic processing system provides energizing signals to said coil of variable level to generate a variable frictional braking torque in form of a feedback signal of the knob, said variable frictional braking torque being variable between a value of zero and a maximum, or locking value.

7. The system of claim 6 wherein the electronic processing system includes means for short time, or instantaneous energization of the coil (7, 64) in dependence on the angular deflection of the rotary knob from said reference position for increasing the braking torque at predetermined angular deflected position to simulate angular index positions of the knob.

8. The system of claim 2 wherein said scanning means (23, 24, 36) provide electrical pulses;
said electronic processing system includes means decoding said pulses and determining direction of rotation and the speed of rotation of the knob as a function of sequential pulses derived from said scanning means;
said electronic processing system, as a function of the pulse sequences derived from said scanning means, controlling energization of the coil, providing output commands to said apparatus (N,28) and providing control signals for a display.

9. The system of claim 8 further including a parallel remote control input on the electronic processing system to permit application of pulses to said electronic processing systems representative of an instantaneous position of said operating knob, and the characteristics of mechanical feedback to the knob and simulating the energizing signal supplied to the coil.

10. The system of claim 8 wherein the electronic processing system includes a forward-backward counter (130) coupled to said scanning means and counting pulses derived from said scanning means representative of deflected position of said knob with respect to said reference position,
said forward-backward counter controlling the energization signals for the coil when the count state of said counter has reached a predetermined value, and to control deenergization of the coil when the counter counts downwardly after having reached said predetermined count value.

11. The system of claim 2 further including means (13, 14) for attaching said system to an operating panel (28);
and wherein said scanning means, and said coil are positioned in a plane essentially parallel to said panel.

12. The system of claim 2 further including a remote control signal transmission link between said scanning means and said toroidal coil on the one hand, and said electronic processing control system on the other.

13. The system of claim 1 wherein said knob is essentially cup-shaped and therefore hollow;
wherein the toroidal coil, the brake disk, and the scanning means are located within the hollow space defined by the cup-shaped knob.

14. The system of claim 13 further including attachment means (13, 14) to attach said knob to a support panel (28) and wherein said toroidal coil, said braking disk, and said scanning means are located externally of said panel.

15. The system of claim 13 wherein the scanning means (23, 24, 36) further scans axial shifting of the knob and the knob movement signals further include axial knob shift signals representative of the axial position of the knob
and an electronic processing system is provided, receiving the knob movement scanning signals from said scanning means,
said electronic processing system including said control means,
said electronic processing system being connected to and providing control signals to the controlled apparatus (M, 28),
said electronic processing system being further connected to said toroidal coil for providing energizing signals to the coil (7, 64) to furnish humanly perceptible feedback to an operator handling and moving said knob.

16. The system of claim 15 wherein said electronic processing system provides energizing signals to said coil of variable level to generate a variable frictional braking torque in form of a feedback signal of the knob, said variable frictional braking torque being variable between a value of zero and a maximum, or locking value.

17. The system of claim 16 wherein the electronic processing includes means for short time, or instantaneous energization of the coil (7, 64) in dependence on the angular deflection of the rotary knob from said reference position for increasing the braking torque at predetermined angular deflected position to simulate angular index positions of the knob.

18. The system of claim 1 wherein axial movement of the knob is independent of axial movement of the brake disk with respect to said toroidal coil.

19. The system of claim 1 wherein the scanning means (23, 24, 36) scanning the axial deflection of the knob scan deflection between an extended and a depressed position;
and wherein said scanning means scanning the deflection position of the knob scans said deflection independently of the axial position of the knob.

20. The system of claim 1 wherein the operation of the braking movement of the knob is independent of the axial position, or change in axial position of the knob.

* * * * *